United States Patent
Duong et al.

(10) Patent No.: US 10,760,499 B2
(45) Date of Patent: Sep. 1, 2020

(54) TURBO-MACHINERY ROTORS WITH ROUNDED TIP EDGE

(71) Applicant: PRATT & WHITNEY CANADA CORP., Longueuil (CA)

(72) Inventors: Hien Duong, Mississauga (CA); Jason Nichols, Mississauga (CA); Vijay Kandasamy, Tamil Nadu (IN)

(73) Assignee: PRATT & WHITNEY CANADA CORP., Longueuil (CA)

( * ) Notice: Subject to any disclaimer, the term of this patent is extended or adjusted under 35 U.S.C. 154(b) by 547 days.

(21) Appl. No.: 13/803,368

(22) Filed: Mar. 14, 2013

(65) Prior Publication Data

US 2014/0260324 A1    Sep. 18, 2014

(51) Int. Cl.
| | |
|---|---|
| *F02C 7/28* | (2006.01) |
| *F01D 5/20* | (2006.01) |
| *F01D 5/22* | (2006.01) |
| *F01D 5/14* | (2006.01) |
| *F01D 11/08* | (2006.01) |

(52) U.S. Cl.
CPC .................. *F02C 7/28* (2013.01); *F01D 5/14* (2013.01); *F01D 5/20* (2013.01); *F01D 5/225* (2013.01); *F01D 11/08* (2013.01); *F05D 2250/192* (2013.01)

(58) Field of Classification Search
CPC . F01D 5/20; F01D 5/225; F01D 11/02; F01D 11/08; F01D 11/10; F02C 7/28; F05D 2250/192
USPC .................. 416/238, 223 A, 223 R, 235; 415/173.1–173.6, 174.4, 174.5
See application file for complete search history.

(56) References Cited

U.S. PATENT DOCUMENTS

| | | | |
|---|---|---|---|
| 4,738,568 A | 4/1988 | Harter | |
| 4,738,586 A * | 4/1988 | Harter | ...................... F01D 5/20 |
| | | | 415/173.5 |
| 6,672,829 B1 * | 1/2004 | Cherry | .................... F01D 5/141 |
| | | | 415/115 |
| 7,281,894 B2 | 10/2007 | Prakash | |
| 7,740,445 B1 * | 6/2010 | Liang | ..................... F01D 5/187 |
| | | | 415/173.5 |

(Continued)

FOREIGN PATENT DOCUMENTS

| | | |
|---|---|---|
| DE | 815971 | 10/1951 |
| EP | 1953344 | 8/2008 |

*Primary Examiner* — Alexander B Comley
(74) *Attorney, Agent, or Firm* — Norton Rose Fulbright Canada LLP

(57) ABSTRACT

A rotor for a gas turbine engine includes a plurality of radially extending blades, each having a remote blade tip defining an outer tip surface, and a leading edge defined between opposed pressure and suction side airfoil surfaces. A shroud circumferentially surrounds the rotor, and a radial distance between an inner surface of the shroud and the outer tip surface of the blades defines a radial tip clearance gap therebetween. The tip of each of the blades has a pressure side edge formed at the intersection between the outer tip surface and the pressure side airfoil surface, and a suction side edge formed at the intersection between the outer tip surface and the pressure side airfoil surface. The suction side edge has a larger radius of curvature than the pressure side edge, thereby reducing the amount of tip leakage flow through the radial tip clearance gap.

13 Claims, 5 Drawing Sheets

(56) References Cited

U.S. PATENT DOCUMENTS

2008/0213098 A1* 9/2008 Neef ..................... F01D 5/20
                                                        416/223 A
2012/0100000 A1* 4/2012 He ....................... F01D 5/20
                                                        416/223 R

* cited by examiner

TURBO-MACHINERY ROTORS WITH ROUNDED TIP EDGE

TECHNICAL FIELD

The application relates generally to gas turbine engines, and more particularly to rotor blades for a gas turbine engine.

BACKGROUND

Continuous attempts are made to improve the efficiency of gas turbine engines, and particularly the compressor and/or turbine sections thereof. Compressors and turbines of gas turbine engines comprise rotating turbo-machinery having a plurality of rotor blades, including for example axial compressors, centrifugal compressors (i.e. impellers) and turbines. A major source of inefficiency of such compressors and/or turbines is caused by tip leakage flow, whereby air escapes through the radial tip clearance gap formed between the tips of the rotor blades and the surrounding casing or shroud. As such, attempts to increase compressor/turbine efficiency in general, and to reduce tip leakage flow in particular, continue to be sought.

SUMMARY

There is provided a rotor for a gas turbine engine comprising: a hub defining a central axis of rotation about which the rotor is rotatable and a plurality of blades radially extending from the hub, the blades being adapted to project into an annular gas flow passage of said gas turbine engine, each of said blades having a remote blade tip defining an outer tip surface, and a leading edge defined between opposed pressure and suction side airfoil surfaces; a shroud circumferentially surrounding the rotor and having a radially inner surface adjacent to the blade tips, a radial distance between the inner surface of the shroud and the outer tip surface of the blades defining a radial tip clearance gap therebetween; and the tip of each of the blades having a pressure side edge formed at a first intersection between the outer tip surface and the pressure side airfoil surface, and a suction side edge formed at a second intersection between the outer tip surface and the pressure side airfoil surface, the pressure side edge having a first radius and the suction side edge having a second radius, the second radius being greater than the first radius, the larger radius suction side edge thereby reducing the amount of tip leakage flow through the radial tip clearance gap.

There is also provided a gas turbine engine comprising: a compressor section, a combustor and a turbine section, in serial flow communication; and at least one of the compressor section and the turbine section defining an annular gas flow passage therethrough and including at least one rotor, the rotor including: a hub defining a central axis of rotation about which the rotor is rotatable and a plurality of blades radially extending from the hub to project into the annular gas flow passage, each of said blades having a remote blade tip defining an outer tip surface and a leading edge defined between opposed pressure and suction side airfoil surfaces of the blades; a shroud circumferentially surrounding the rotor and having a radially inner surface adjacent to the blade tips, a radial distance between the inner surface of the shroud and the outer tip surface of the blades defining a radial tip clearance gap therebetween; and the tip of each of the blades having a pressure side tip edge formed at a first intersection between the outer tip surface and the pressure side airfoil surface, and a suction side tip edge formed at a second intersection between the outer tip surface and the pressure side airfoil surface, the pressure side tip edge having a first radius and the suction side tip edge having a second radius, the second radius being greater than the first radius, the suction side tip edge thereby being more rounded that the pressure side tip edge and reducing the amount of tip leakage flow through the radial tip clearance gap.

There is further provided a method of improving gas turbine engine rotor efficiency by reducing tip leakage flow thereof comprising: providing a rotor rotatable about an axis of rotation within an outer shroud surrounding said rotor, the rotor having a plurality of radially projecting blades extending into an annular gas flow passage, the annular gas flow passage being radially enclosed by an inner surface of the outer shroud, each of said blades having a remote blade tip defining an outer tip surface and a leading edge defined between opposed pressure and suction side airfoil surfaces, the inner surface of the shroud being adjacent to the blade tips and a radial distance between the inner surface of the shroud and the outer tip surface of the blades defining a radial tip clearance gap therebetween; rotating said rotor through the annular gas flow passage in a first rotational direction corresponding to a direction of rotation of the rotor, a tip leakage flow being formed in the radial tip clearance gap, the tip leakage flow being in a direction opposite to the direction of rotation of the rotor; and reducing tip leakage flow through the radial tip clearance gap by providing the blades with a suction side tip edge, formed at the intersection between the outer tip surface and the suction side airfoil surface, that has a greater radius of curvature than a pressure side tip edge, formed at the intersection between the outer tip surface and the pressure side airfoil surface.

Further details of these and other aspects of the present invention will be apparent from the detailed description and figures included below.

BRIEF DESCRIPTION OF THE DRAWINGS

Reference is now made to the accompanying figures, in which.

DETAILED DESCRIPTION

Figure 1:
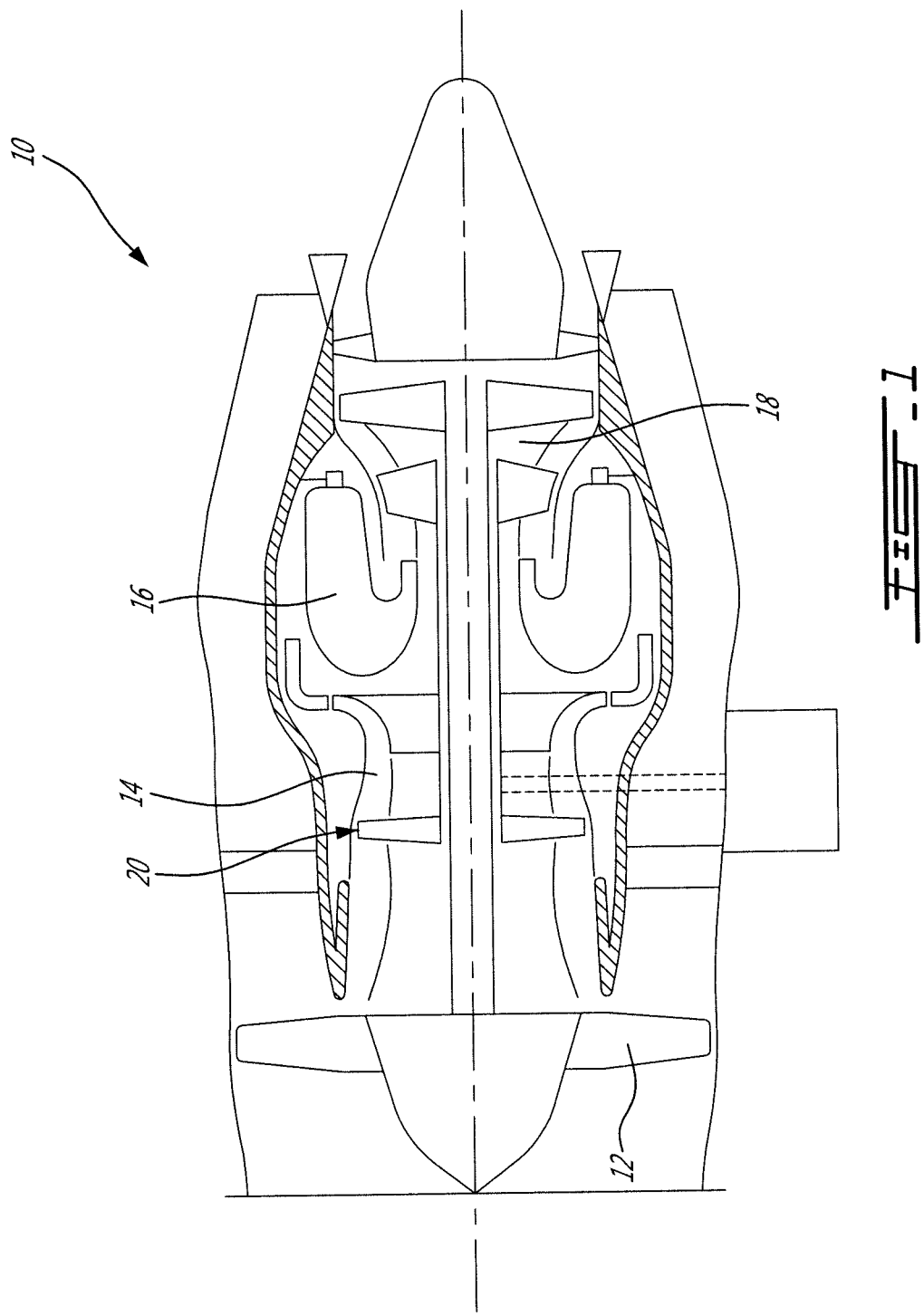
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The multistage compressor section 14 includes an axial compressor 20, as will be further described. Although a turbofan engine is depicted and described herein, it will be understood however that the gas turbine engine 10 may comprise other types of gas turbine engines such as a turbo-shaft, a turbo-prop, or auxiliary power units.

The compressor section 14 of the gas turbine engine 10 may be a multi-stage compressor, and thus may comprise several axial and/or centrifugal compressors. Although the present disclosure will focus on an axial compressor 20, i.e. having an axial turbo machine rotor, it is to be understood that the compressor 20 as described herein may also be a centrifugal compressor (i.e. impeller) and/or a mixed flow rotor. Further, although the features of the present disclosure are described below with reference to a compressor rotor, it is to be understand that they can be similarly applied to a rotor blade of a turbine.

Figure 2:
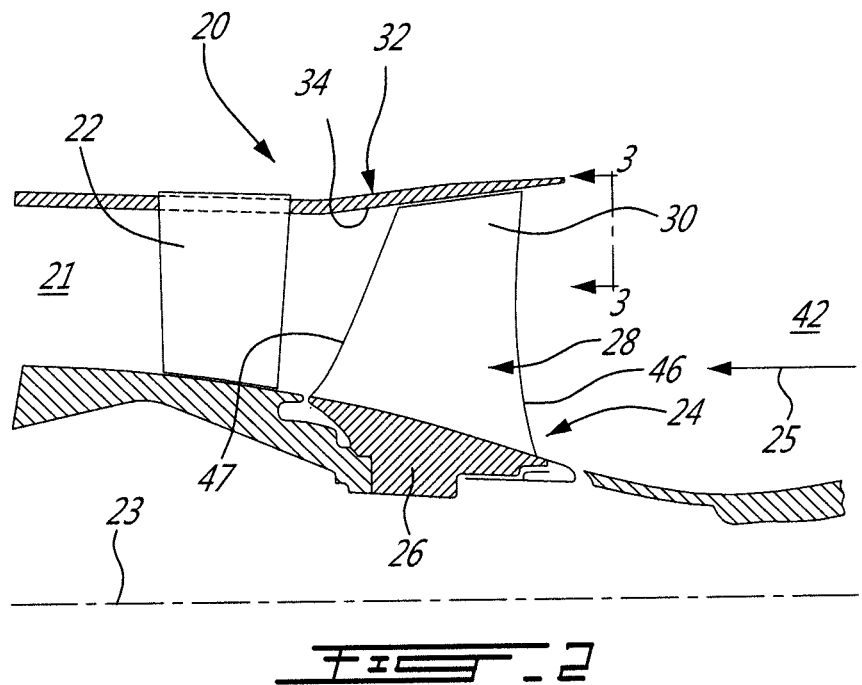
FIG. 2 is a partial cross-sectional view of an axial compressor of the gas turbine engine of FIG. 1.
Figure 3:
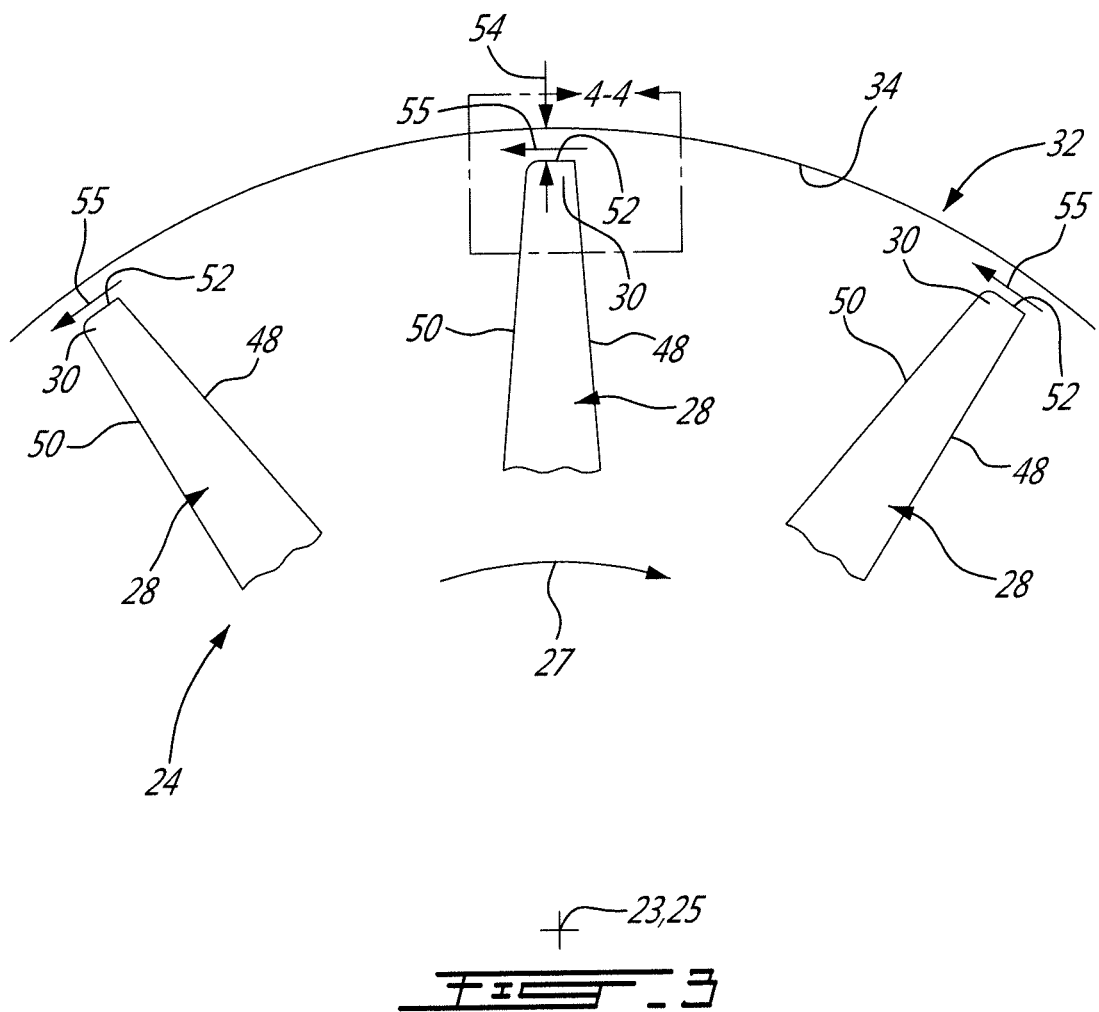
FIG. 3 is schematic front cross-sectional view of the compressor of FIG. 2, taken along line 3-3 of FIG. 2.

Referring to FIGS. 2 and 3, the axial compressor 20 of the compressor section 14 comprises generally a rotor 24 and a stator 22 downstream relative thereto, each having a plurality of blades defined within the gas flow path which is defined by the compressor inlet passage 42 upstream of the rotor 24 and the compressor discharge passage 21 downstream of the stator 22. The gas flowing in direction 25 is accordingly fed to the compressor 20 via the compressor inlet passage 42 and exits therefrom via the compressor discharge passage 21. The rotor 24 rotates about a central axis of rotation 23 within the stationary and circumferentially extending outer shroud 32, the radially inwardly facing wall 34 of which defines a radial outer boundary of the annular gas flow path through the compressor 20. The rotor 24 includes a central hub 26 and a plurality of blades 28 radially extending therefrom and terminating in blade tips 30 immediately adjacent the outer shroud 32.

The rotation of the compressor rotor 24 is shown in FIG. 3 by displacement of the rotor blades 28 in direction 27 about the central axis 23 and relative to the gas flow direction 25 which is substantially parallel to the longitudinally extending central axis 23. As best seen in FIG. 2, each blade 28 has a leading edge 46 and a trailing edge 47. Each of the blades 28 also includes, on opposite sides thereof and separated by the leading and trailing edges 46 and 47, a pressure side airfoil surface 48, or simply pressure side, of the blade and a suction side airfoil surface 50, or suction side, of the blade, as best seen in FIG. 3. The stationary outer shroud 32, which extends circumferentially and radially surrounds the rotor blades 28, includes an inner surface 34 proximate the tips 30 of the rotor blades 28. A radial distance between this inner surface 34 of the shroud 32 and the outer tip surface 52 of each of the blade tips 30 defines the tip clearance gap 54. Any tip leakage flow 55 therefore occurs through the radial tip clearance gap 54, which is radially defined between the inner surface 34 of the outer shroud 32 and the outer end surface 52 of the tips 30 of the rotor blades 28. The tip leakage flow 55 flows, through the radial tip clearance gap 54, in a direction which is opposite to the direction of rotation 27 of the rotors blades 28.

Figure 4:
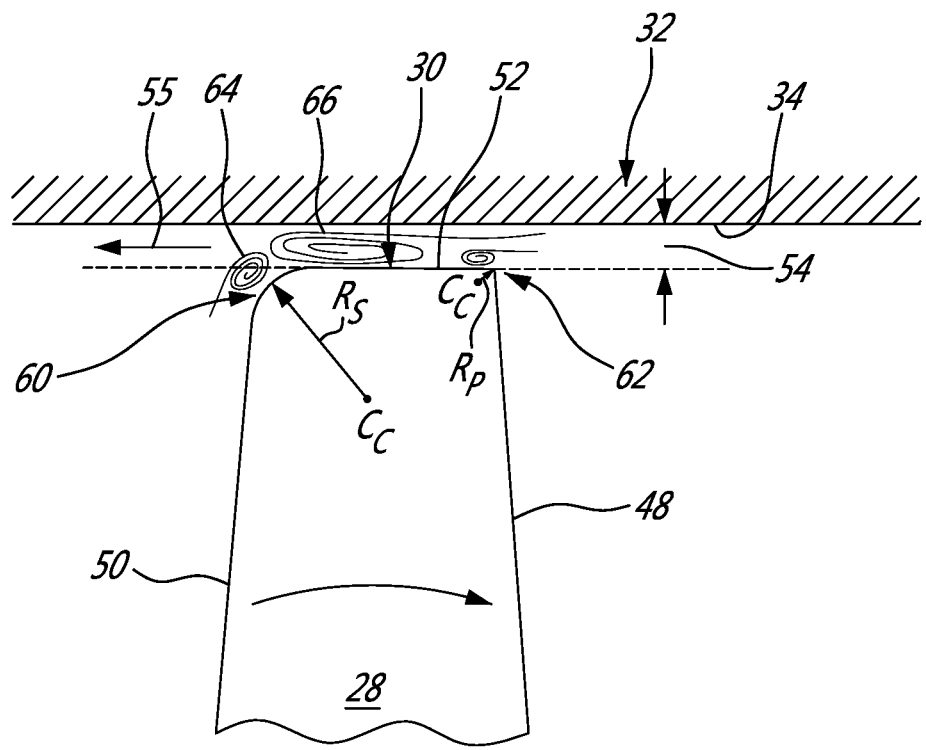
FIG. 4 is a detailed front cross-section view of a rotor blade tip of the compressor of FIG. 2, taken from region 4 in FIG. 3.

Referring now to FIG. 4, each rotor blade 28 includes a rounded tip edge 60 on the suction side 50 of the tip 30 thereof. This compares, for example, to the more standard and relatively sharper corner 62 formed on the pressure side 48 of the blade tip 30. In other words, the edge formed at the intersection between the tip end surface 52 and the pressure side surface 48 is a relatively sharp corner edge 62, while the edge formed at the intersection between the tip end surface 52 and the suction side surface 50 at the blade forms a "more rounded" (i.e. having a greater radius of curvature) edge 60. Accordingly, as seen in FIG. 4, the pressure side edge 62 has a first radius of curvature Rp and the suction side edge 60 has a second radius of curvature Rs, the second radius Rs being greater than the first radius Rp. Further, as can be seen in FIG. 4, the first radius Rp and the second radius Rs each have a center of curvature CC that is located radially inwardly from the outer Up end surface 52 of the blade 28.

This more rounded tip edge 60 formed on the suction side 50 of the rotor blade 28 has been found to be able to reduce the amount of tip leakage flow through the tip clearance gap 54, which as a result, enables a number of potential advantages, including for example only, an increase in rotor efficiency, an increase in rotor flow (choking) capacity, an increase in rotor throttle ability (stall margin), increase rotor tolerance to tip clearance change, and a lower acoustic signature of the engine.

The rounded tip edge 60 of the suction side 50 of the rotor blades 28 alters the flow structures near the tip clearance gap (radial gap between the outer surface 52 of the blade tips 30 and the inner surface 34 of the surrounding outer shroud 32) and helps to reduce and/or inhibit tip leakage flow.

The rounded tip edge 60 on the suction side 50 of the blade tips 30, which has a greater radius of surface than the edge 62 on the pressure side of the blade tips 30, acts as a diffuser whereby leakage flow that emanates from the pressure side of the blade is slowed down before exiting the radial tip clearance gap 54 and mixing with the main gas path flow. This diffuser-caused reduction in leakage flow velocity reduces the mixing losses.

Further, the rounded edge 60 on the suction side 50 of the blade tip 30 causes an effectively larger gap size locally at the suction side edge relative to the remainder of the tip clearance gap 54. This larger gap size allows shroud boundary layer secondary flow 66, which occurs in compressors near the casing or shroud in a direction opposite to that of tip leakage flow and is caused by relative motion of the outer case with respect to the rotor blades 28, to enter the blade tip gap region more readily. Accordingly, more of this secondary flow 66 is dragged into the tip clearance gap 54 via the larger rounded tip edge 60, the secondary flow 66 thereby acting as an obstruction to the leakage flow, which flows in a direction opposite the secondary flow 66, through the tip clearance gap 54.

A further reason why the rounded tip edge 60 on the suction side of the blade tips 30 helps reduce tip leakage flow is the formation of a local blockage of centrifugal secondary flow. This centrifugal secondary flow migrates radially outward from hub to shroud along the surface of the blade 28 due to centrifugal force. The round edge 60 on the suction side 50 of the blade 28 increases the gap width, as noted above, thereby acting as a diffuser. This diffusion of secondary flow along with the interaction with the jet-like tip clearance flow creates a small aerodynamic "roll up" 64 on the suction side of the blade proximate the tip 30. This roll up 64 forms a local blockage and further helps prevent leakage tip flow.

Figure 5:
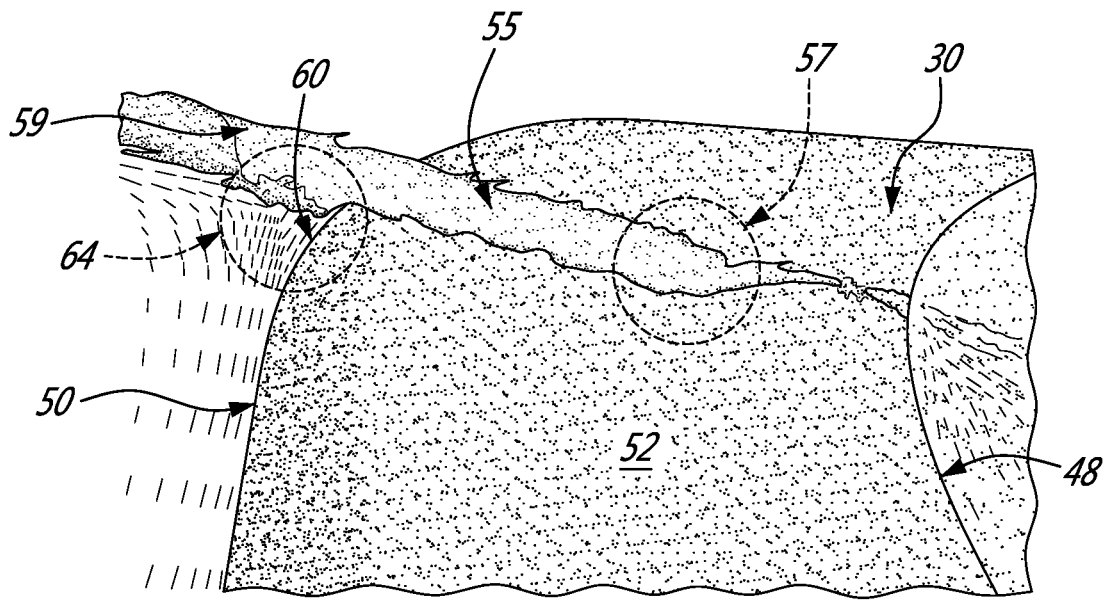
FIG. 5 is a partial perspective view of a computational fluid dynamics model of tip clearance leakage flow over a rotor blade tip of FIG. 4 having a rounded suction side tip edge.

As can be seen in FIG. 5, which depicts computational fluid dynamic (CFD) test results of a blade tip 30 having a rounded tip edge 60 on the suction side 50, the suction side roll up 64 created by the rounded edge 60 is evident. This suction side roll up 64 reduces the velocity of the tip leakage flow 55 across the outer surface 52 of the blade tip 30. As is also seen from the CFD results of FIG. 5, the velocity profile of the tip leakage flow 55 is distorted at region 57, and the resistance caused by the shroud boundary layer flow on the suction side of the blade tip is evident at 59.

While the rounded tip edge 60 on the suction side 50 of the blade tips 30 has at least a greater radius than the much sharper edge 62 on the pressure side of the blade tips 30, in at least on embodiment the rounded suction side edge 60 has a radius of between 0.01 inches and 0.02 inches, and more preferably between 0.01 and 0.015 inches. In one particular embodiment the rounded suction side edge 60 has a radius of approximately 0.012 inches. Such rounded tip edges 60 were found to reduce tip leakage, for the reasons set out above, over a range of different radial tip clearance sizes, for example 0.005", 0.01" and 0.015". In comparison, the pressure side tip edge 62 is substantially sharp or non-rounded, but may have nominal very small radius of approximately 0.003 inches. In at least one embodiment, therefore, the radius of the rounded suction side tip edge 60 is approximately 2 to 6 times larger than the radius of the sharp pressure side tip edge 62.

Figure 6A:
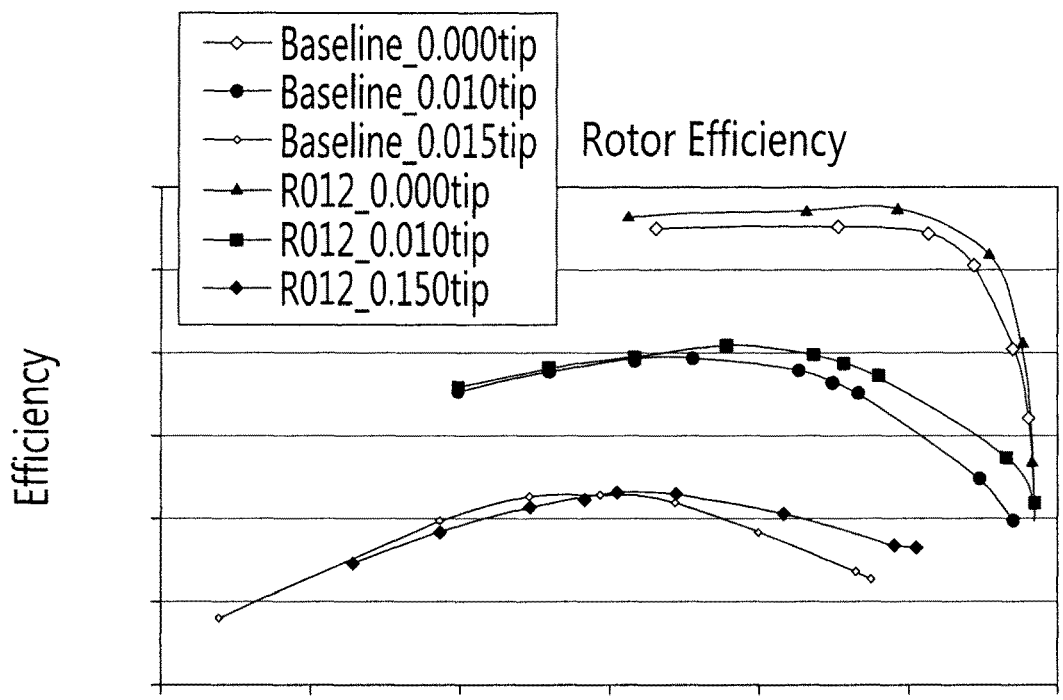
FIGS. 6a and 6b depict graphs representing the efficiency of rotors having suction side rounded tip edges as described herein relative to baseline rotors (i.e. having non-rounded suction side tip edges), at three different blade tip clearance gaps.
Figure 6B:
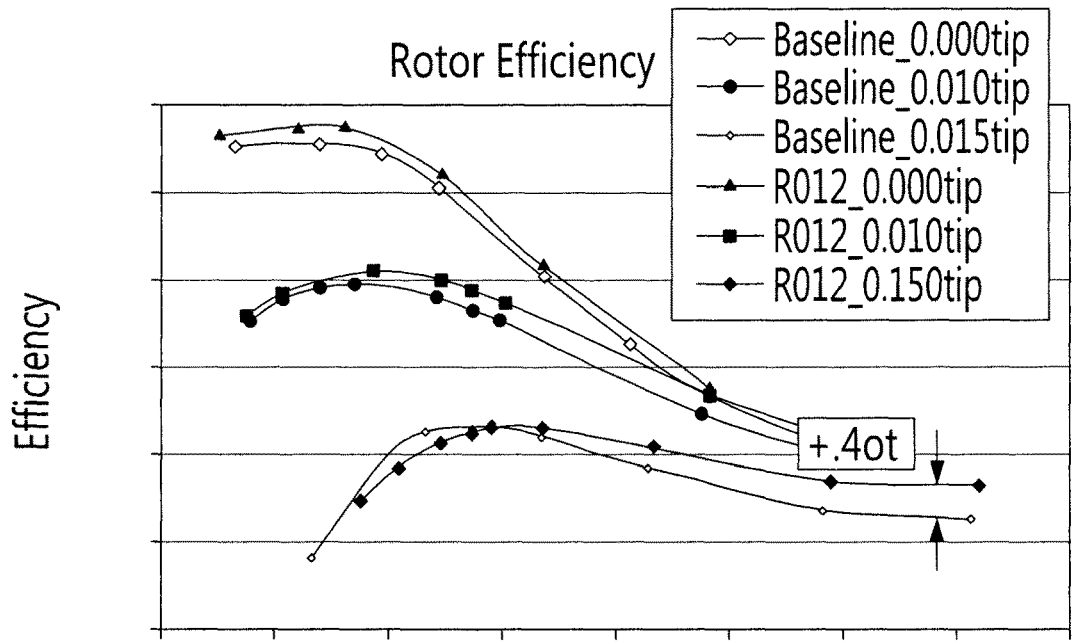

The presently described blades with suction side rounded tip edges 60 have been found to reduce tip clearance flow losses at a number of different radial tip clearance sizes, and therefore to improve the overall efficiency of rotors having such blades. As shown in FIGS. 6a-6b, the efficiency of rotors having suction side rounded tip edges as described herein relative to baseline rotors (i.e. having non-rounded suction side tip edges) are shown for three different blade tip clearance gaps, namely 0.005", 0.01" and 0.015". As can be seen by the graphs shown in FIGS. 6a-6b, the results show efficiency improvement increases toward the choke side, suggesting for example that there is a drop in mixing losses when rotors having suction side rounded tip edges 60 are employed. A reduction in clearance flow would also lead to lower shock losses, reduction in aerodynamic blockage and result in higher flow (choking) capacity.

Because the suction side rounded tip edges 60 have been found to reduce tip clearance flow losses at a number of different radial tip clearance sizes, another advantage is that blades having suction side rounded tip edges 60 thereon can be retrofit into existing compressor and/or turbine designs, thereby enabling existing gas turbine engines to be retrofit, after first production, in order to incorporate rotor blades having such a suction side rounded tip edge 60 and thus improve the efficiency of their compressors and/or turbines by reducing the rotor tip clearance losses as described above. Further, it is also of note that the efficiency improvements found to be provided with rotor blades having the suction side rounded tip edge 60 hold true for a large number of rotor speeds, making retrofitting various engine designs, rotor speeds, compressor and/or turbine configurations possible.

Figure 7A:
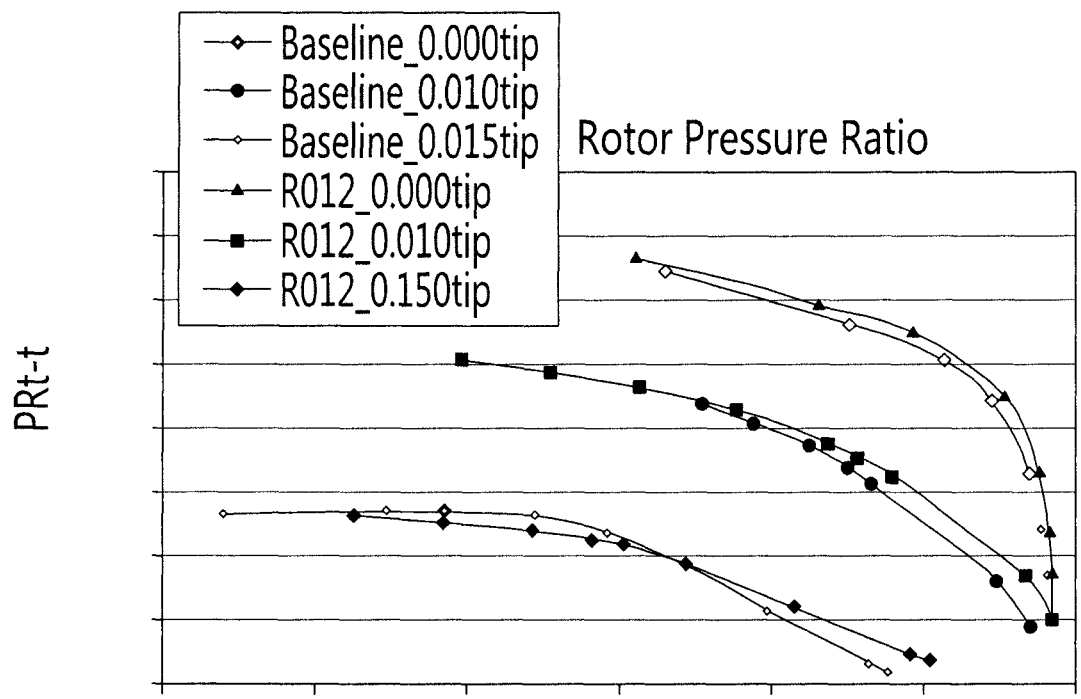
FIGS. 7a and 7b depict graphs respectively representing the rotor and stage pressure ratios of rotors having blades with suction side rounded tip edges as described herein, relative to baseline rotors (i.e. having non-rounded suction side tip edges), at three different blade tip clearance gaps.
Figure 7B:
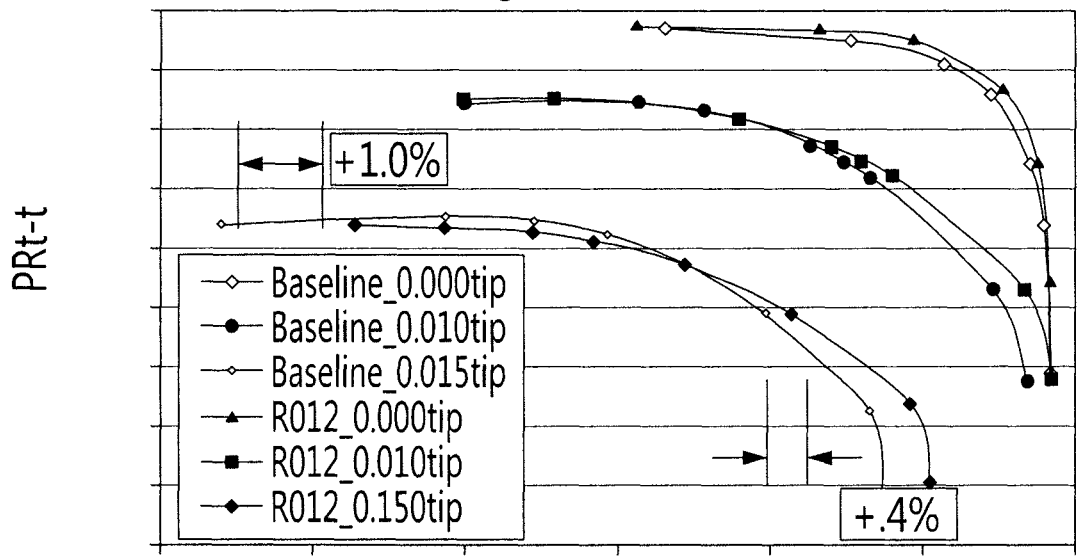

The suction side rounded tip edge 60 as described above has also been found to improve the pressure ratios produced by the rotor itself and thus also by the entire compressor and/or turbine stage having such a rotor. More particularly, as shown in FIGS. 7a and 7b, on the stall side at higher tip clearances, an extension of stall flow for rotors with rounded suction side tip edges is provided. Accordingly, rotors having suction side rounded tip edges as described herein enable an increase in rotor range, which is important for low speed compressor stability and could also potentially reduce the cost and development time of gas turbine engine compressors.

The above description is meant to be exemplary only, and one skilled in the art will recognize that changes may be made to the embodiments described without departing from the scope of the invention as claimed. For example, as noted above, although the embodiments described relate to an axial compressor, the compressor shroud defined herein may also be employed in a centrifugal compressor or a mixed flow rotor for example. Still other modifications which fall within the scope of the appended claims will be apparent to those skilled in the art, in light of a review of this disclosure.

The invention claimed is:

1. A rotor for a gas turbine engine comprising:
a hub defining a central axis of rotation about which the hub is rotatable to define a direction of rotation of the rotor, and a plurality of blades each radially extending from the hub along a radial blade axis, the blades being adapted to project into an annular gas flow passage of said gas turbine engine, each of said blades having a remote blade tip defining an outer end surface substantially aligned with the radial blade axis, the outer end surface being a radially outermost surface of the blade tip, and a leading edge defined between opposed pressure and suction side airfoil surfaces;
a shroud circumferentially surrounding the rotor and having a radially inner surface adjacent to the blade tips, a radial distance between the inner surface of the shroud and the outer end surface of the tips of the blades defining a radial tip clearance gap therebetween; and
the tip of each of the blades having a pressure side edge formed at a first intersection between the outer end surface and the pressure side airfoil surface, and a suction side edge being rounded and formed at a second intersection between the outer end surface and the suction side airfoil surface, the pressure side edge and the suction side edge being external edges of the blade tip, the pressure side edge having a first radius and the suction side edge having a second radius, the second radius being greater than the first radius and both the first radius and the second radius having a center of curvature that is located radially inwardly from the outer end surface of the blade tip, the larger radius suction side edge thereby reducing the amount of tip leakage flow through the radial tip clearance gap;
wherein the radial tip clearance gap is substantially constant at all points between the radii of the pressure side edge and the suction side edge.

2. The rotor as defined in claim 1, wherein the suction side edge, which has a greater radius than the pressure side edge, forms a diffuser which slows down tip leakage flow at the exit of the radial tip clearance gap.

3. The rotor as defined in claim 1, wherein the suction side edge, which has a greater radius than the pressure side edge, forms a greater tip clearance gap at the suction side airfoil surface of the blade than at the pressure side airfoil surface, the greater tip clearance gap at the suction side of the blade drawing shroud boundary layer secondary flow through the radial tip clearance gap in a direction opposite to said tip leakage flow.

4. The rotor as defined in claim 1, wherein the second radius of said suction side edge is at least 2 times greater than the first radius of said pressure side edge.

5. The rotor as defined in claim 4, wherein the second radius of the suction side edge is between 2 and 6 times greater than the first radius of the pressure side edge.

6. The rotor as defined in claim 1, wherein the rotor is an axial compressor rotor or a turbine rotor.

7. A gas turbine engine comprising:
a compressor section, a combustor and a turbine section, in serial flow communication; and
at least one of the compressor section and the turbine section defining an annular gas flow passage therethrough and including at least one rotor, the rotor including:
  a hub defining a central axis of rotation about which the hub rotates to define a direction of rotation of the rotor, and a plurality of blades each radially extending from the hub along a radial blade axis to project into the annular gas flow passage, each of said blades having a remote blade tip defining an outer end surface substantially aligned with the radial blade axis and a leading edge defined between opposed pressure and suction side airfoil surfaces of the blades, the outer end surface being a radially outermost surface of the blade tip;
  a shroud circumferentially surrounding the rotor and having a radially inner surface adjacent to the blade tips, a radial distance between the inner surface of the shroud and the outer end surface of the tips of the blades defining a radial tip clearance gap therebetween; and
  the tip of each of the blades having a pressure side tip edge formed at a first intersection between the outer end surface and the pressure side airfoil surface, and a suction side tip edge formed at a second intersection between the outer end surface and the suction side airfoil surface, the pressure side edge and the suction side edge being external edges of the blade tip, the pressure side tip edge having a first radius and the suction side tip edge having a second radius, the second radius being greater than the first radius and both the first radius and the second radius having a center of curvature that is located radially inwardly from the outer end surface of the blade tip, the suction side tip edge thereby being more rounded that the pressure side tip edge and reducing the amount of tip leakage flow through the radial tip clearance gap, the suction side tip edge forms a greater tip clearance gap at the suction side airfoil surface of the blade than at the pressure side airfoil surface, the greater tip clearance qap at the suction side of the blade drawing shroud boundary layer secondary flow through the radial tip clearance gap in a direction opposite to said tip leakage flow.

8. The gas turbine engine as defined in claim 7, wherein the suction side tip edge, which has a greater radius than the pressure side tip edge, forms a diffuser which slows down tip leakage flow at the exit of the radial tip clearance gap.

9. The gas turbine engine as defined in claim 7, wherein the rotor is an axial compressor rotor.

10. The rotor as defined in claim 7, wherein the second radius of said suction side tip edge is at least 2 times greater than the first radius of said pressure side tip edge.

11. The rotor as defined in claim 10, wherein the second radius of the suction side tip edge is between 2 and 6 times greater than the first radius of the pressure side tip edge.

12. A method of improving gas turbine engine rotor efficiency by reducing tip leakage flow thereof comprising:
  providing a rotor rotating in a direction of rotation about an axis of rotation within an outer shroud surrounding said rotor, the rotor having a plurality of radially projecting blades extending into an annular gas flow passage along respective radial blade axes, the annular gas flow passage being radially enclosed by an inner surface of the outer shroud, each of said blades having a remote blade tip defining an outer end surface substantially aligned with each of the radial blade axes and a leading edge defined between opposed pressure and suction side airfoil surfaces, the outer end surface being a radially outermost surface of the blade tip, the inner surface of the shroud being adjacent to the blade tips and a radial distance between the inner surface of the shroud and the outer end surface of the blades defining a radial tip clearance gap therebetween;
  rotating said rotor through the annular gas flow passage in a first rotational direction corresponding to a direction of rotation of the rotor, a tip leakage flow being formed in the radial tip clearance gap, the tip leakage flow being in a direction opposite to the direction of rotation of the rotor; and
  reducing tip leakage flow through the radial tip clearance gap by providing the blades with a suction side tip edge that has a greater radius of curvature than a pressure side tip edge, including forming the pressure side tip edge at a first intersection between the outer end surface and the pressure side airfoil surface and forming the suction side tip edge to be rounded at a second intersection between the outer end surface and the suction side airfoil surface, the pressure side edge and the suction side edge being external edges of the blade tip, the radius of curvature of both the suction side tip edge and the pressure side tip edge having a center of curvature that is located radially inwardly from the outer end surface of the blade tip, and forming a greater tip clearance gap at the suction side airfoil surface of the blade than at the pressure side airfoil surface, the greater tip clearance gap at the suction side of the blade drawing shroud boundary layer secondary flow through the radial tip clearance gap in a direction opposite to said tip leakage flow.

13. The method as defined in claim 12, wherein the step of reducing tip leakage further comprises forming a diffuser at the suction side tip edge by slowing down the tip leakage flow at the exit of the radial tip clearance gap.

* * * * *